United States Patent [19]
Kilgore

[11] Patent Number: 5,903,659
[45] Date of Patent: May 11, 1999

[54] ADAPTIVE NON-UNIFORMITY COMPENSATION ALGORITHM

[75] Inventor: Patrick M. Kilgore, Tucson, Ariz.

[73] Assignee: Raytheon Company, Lexington, Mass.

[21] Appl. No.: 08/843,874

[22] Filed: Apr. 17, 1997

[51] Int. Cl.⁶ .............. G06K 9/03; G06K 9/43; G06T 5/00
[52] U.S. Cl. ............ 382/103; 382/255; 382/260; 382/218; 250/332; 250/347
[58] Field of Search .................... 382/103, 218, 382/255, 263, 264, 262, 261, 260, 275, 254, 266, 269, 106; 348/169, 607, 241, 252, 625, 345, 348; 250/347, 332, 208.1

[56] References Cited

U.S. PATENT DOCUMENTS

| | | | |
|---|---|---|---|
| 3,987,243 | 10/1976 | Schwartz | 348/625 |
| 5,307,175 | 4/1994 | Seachman | 348/241 |
| 5,373,151 | 12/1994 | Eckel, Jr. et al. | 250/332 |
| 5,400,161 | 3/1995 | Lambert, Jr. | 250/332 |

FOREIGN PATENT DOCUMENTS 562814  9/1993  European Pat. Off. ......... H04N 5/33

*Primary Examiner*—Scott Rogers
*Attorney, Agent, or Firm*—David W. Collins; Leonard A. Alkov; Glenn H. Lenzen, Jr.

[57] ABSTRACT

An adaptive method for removing fixed pattern noise from focal plane array (FPA) imagery. A set of correction terms is applied to the focused image from the FPA, and a filter is applied to the corrected, focused image. The set of correction terms is also applied to a blurred version of the FPA image, and the filter is applied to the corrected, blurred image. Fixed pattern noise errors are then calculated using the filtered imagery, and employed to update the correction terms. The updated correction terms are then used for processing the next image. In one embodiment, the filter is an anti-median filter. In another embodiment, the filter is an anti-mean filter.

16 Claims, 11 Drawing Sheets

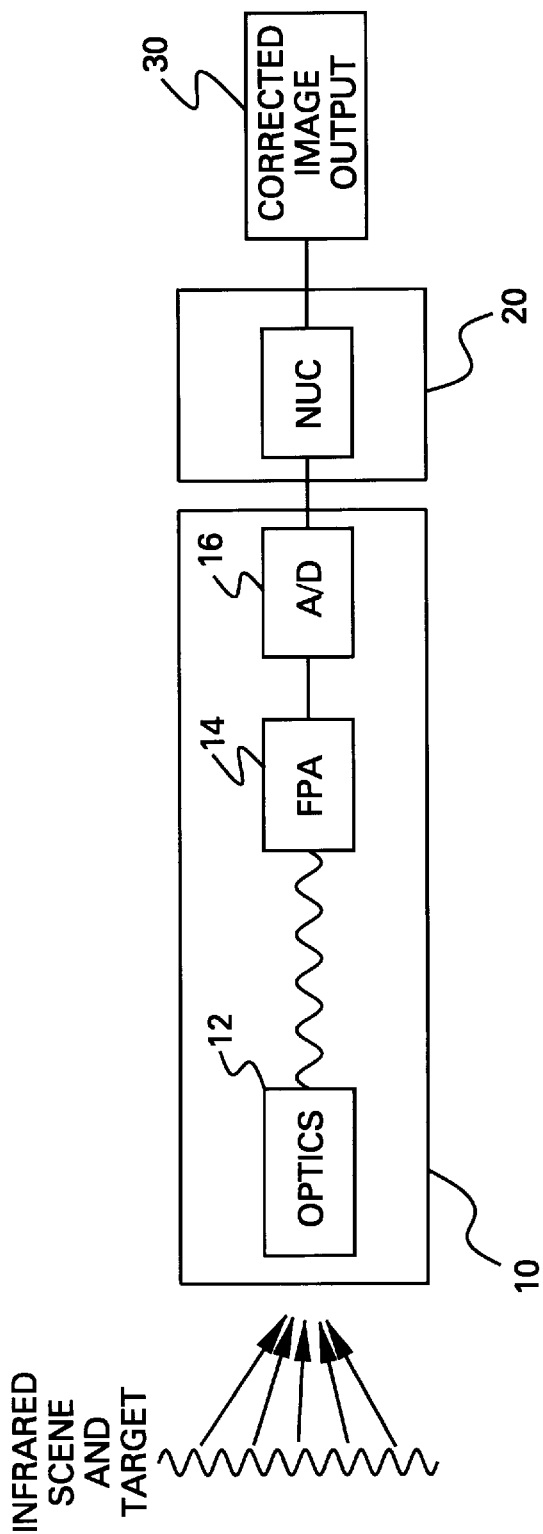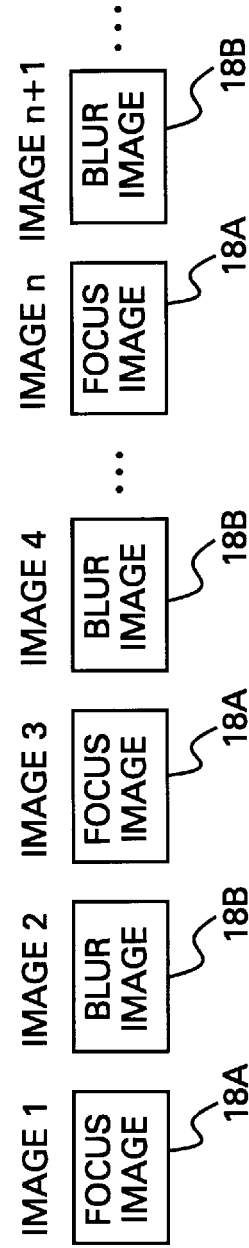

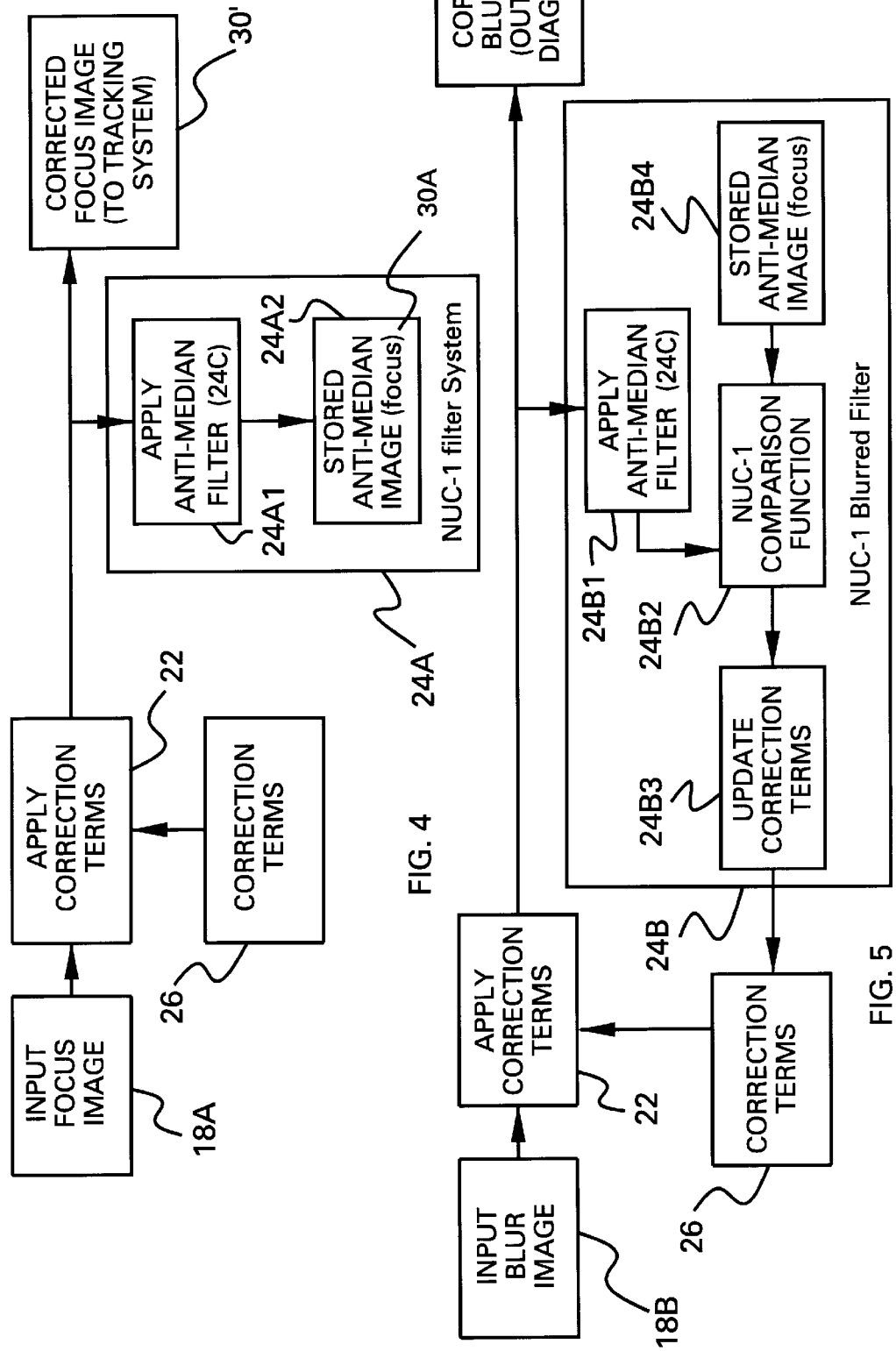

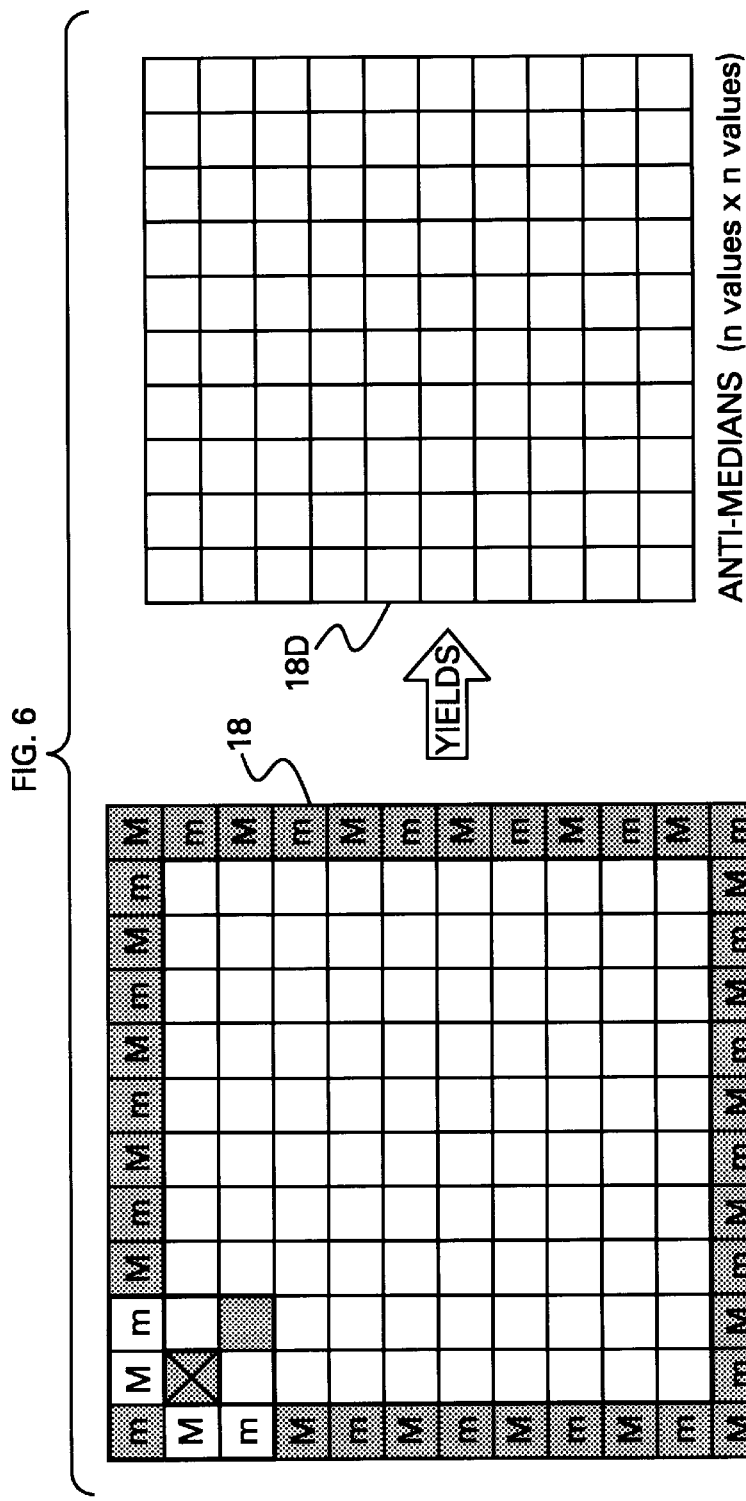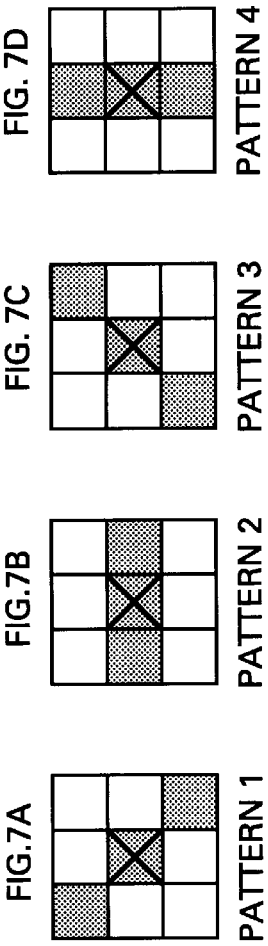

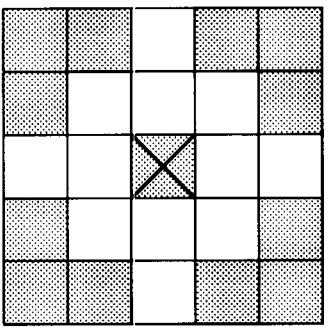
PATTERN 2
FIG. 15B
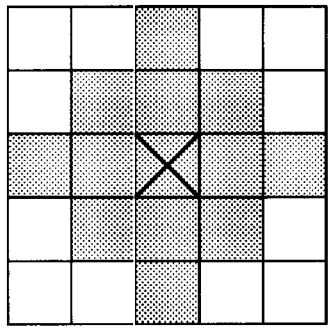
PATTERN 1
FIG. 15A
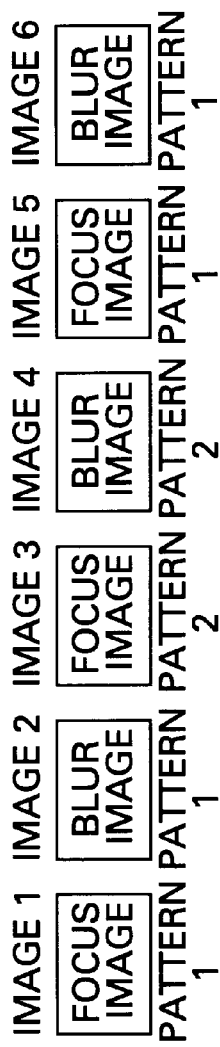
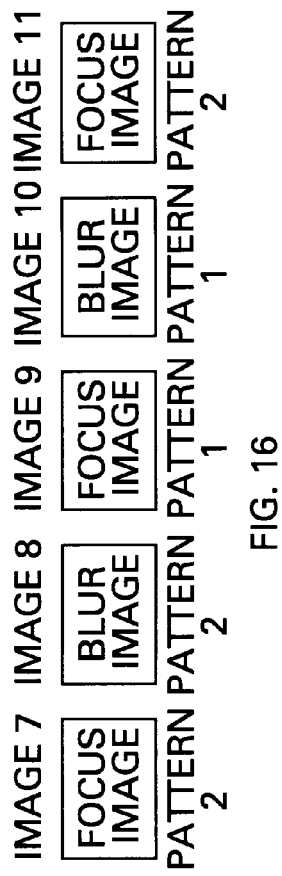
FIG. 16

ADAPTIVE NON-UNIFORMITY COMPENSATION ALGORITHM

TECHNICAL FIELD OF THE INVENTION

This invention relates to processes for the removal of fixed pattern noise from sensor images.

BACKGROUND OF THE INVENTION

Focal plane arrays (FPAs) are used in various applications to capture images for subsequent processing. For example, air-to-air missiles have employed infrared sensors with FPAs to capture infrared images of a target being tracked. The focal plane array contains n×n infrared detectors. Each detector has a slightly different sensitivity to infrared radiation. This non-uniform sensitivity yields fixed pattern noise (FPN). FPN manifest itself in the image resulting in some pixels which are too bright and some which are too dark.

Some missile sensor processors have employed algorithms to reduce FPN. Currently used algorithms have introduced significant scene artifacts in the output image which causes the missile tracker to mis-track the target. Efforts to reduce the scene artifact growth have resulted in insufficient fixed pattern noise reduction under certain simulated flight conditions.

It would therefore be advantageous to provide a technique for removal of fixed pattern noise from sensor images without introducing significant scene artifacts.

SUMMARY OF THE INVENTION

An adaptive method for removing fixed pattern noise from focal plane array (FPA) imagery is described. The method comprises the following steps:

obtaining respective focused and blurred digitized versions of an FPA image;

applying a set of correction terms to the focused version of said FPA image to provide a corrected, focused FPA image;

applying a filter to the corrected, focused version of said FPA image to obtain a filter focus image;

applying said set of correction terms to said blurred version of the FPA image to provide a corrected, blurred version of said FPA image;

applying said filter to the corrected, blurred image to provide a filter blur image;

calculating fixed pattern noise errors using the filter focus image and the filter blur image; and employing said fixed pattern noise errors to update the correction terms for use in processing a next FPA image.

In a first embodiment, the filter includes an anti-median filter which provides, for each pixel in an image, a corresponding anti-median value which is a measure of how the pixel differs from a median value of the pixel and a set of neighboring pixels. In a second embodiment, the filter includes an anti-mean filter which provides, for each pixel in an image, a corresponding anti-mean value which is a measure of how the pixel differs from a mean value of the pixel and a set of neighboring pixels.

BRIEF DESCRIPTION OF THE DRAWING

These and other features and advantages of the present invention will become more apparent from the following detailed description of an exemplary embodiment thereof, as illustrated in the accompanying drawings, in which:

FIG. 1 is a simplified schematic diagram of a missile tracking system with which the present invention is advantageously utilized.

FIG. 2 illustrates a sequence of images 1 . . . n+1, alternating between a focussed image and a blurred image, produced at the sensor output of the system of FIG. 1.

FIG. 4 illustrates the focussed image processing for the filter system of FIG. 3.

FIG. 5 is a flow diagram showing the blurred image processing for the filter system of FIG. 3.

FIG. 6 illustrates the application of the anti-median filter processing of the filter system of FIG. 3.

FIGS. 7A–7D illustrate four filter patterns used in the filter system of FIG. 3.

FIGS. 15A and 15B respectively show two filter patterns used for the filter system of FIG. 11.

FIG. 16 shows the cycling of the filter patterns of FIGS. 15A and 15B for each successive pair of focus/blur frames.

DETAILED DESCRIPTION OF THE PREFERRED EMBODIMENTS

Figure 3:
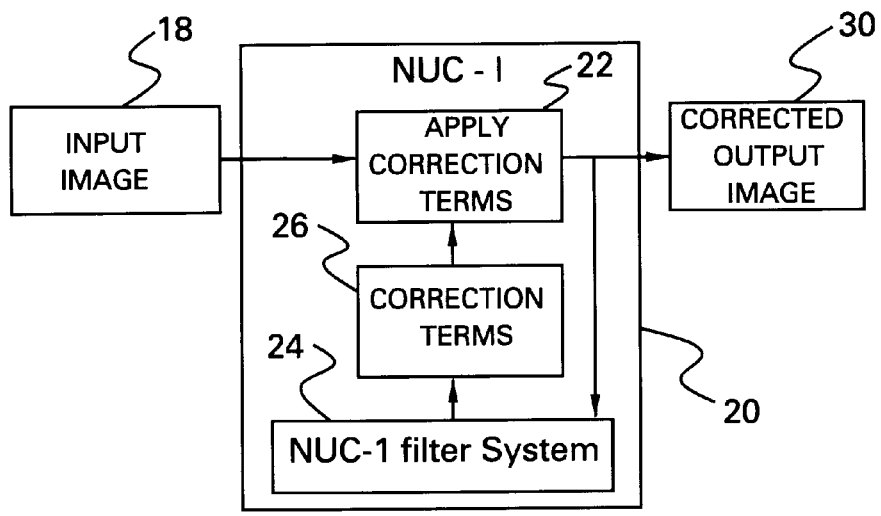
FIG. 3 is a top level flow diagram illustrative of a first embodiment of the adaptive NUC process of the invention.

FIG. 1 is a simplified schematic diagram of a missile tracking system with which the present invention is advantageously utilized. In general the tracking system includes a sensor 10 which produces an image. Typically, the sensor 10 includes optics 12 for collecting and focusing incident infrared energy from the ambient scene and target on the focal plane array 14, which produces an infrared image of the scene/area being tracked. The sensor 10 includes an analog-to-digital (A/D) convertor 16, which converts each of the n×n detector outputs into digital (numeric) values or pixels. The digitized images are processed in accordance with the invention by the adaptive non-uniformity compensation (NUC) processor 20 to provide corrected output images 30 in which scene artifacts have been reduced, and fixed pattern noise has been reduced or eliminated. The NUC processor 20 adjusts each pixel to compensate for the differing sensitivity of each detector in the FPA 14. The missile tracking system (not shown) then employs the corrected output images in the tracking of targets.

FIG. 2 illustrates a sequence of images 1 . . . n+1, alternating between a focussed image and a blurred image. The sensor output yields alternating focused and blurred images. The focus and blurring is controlled by the sensor optics 12. One exemplary way to achieve the focus and blurred images is to use a filter wheel in the sensor optics 12. The filter wheel spins, and has separate optics/lens to provide the focus image and the blurred image. The blurred images are used as part of the NUC process to help discriminate scene and target from FPN.

FIG. 3 is a top level flow diagram illustrative of a first embodiment of the adaptive NUC process of the invention. The input image 18, which is either a focused image 18A or a blurred image 18B, is received from the sensor 10. The correction terms 26 are applied to the input image at step 22 to yield a corrected output image. The correction terms are initially zeros. The corrected output image 30 is passed both to the tracking system and to the NUC filter system 24. A different NUC filter is used for both the focused and blurred images. These two filters are described below. The filter system 24 updates the correction terms 26 based on the corrected output image.

FIG. 4 illustrates the focused image processing for the filter system 24 of FIG. 3. The input focused image 18A is received from the sensor, and the correction terms 26 are applied at step 22 to yield the corrected focused image 30, as described above. The filter system 24 includes a focused image filter 24A, which includes the application of an anti-median filter 24C at step 24A1 to the corrected focused image to yield an anti-median image 30A. The image 30A is stored in memory for use on the following blurred image 18B.

FIG. 5 is a flow diagram showing the blurred image processing for the filter system 24 of FIG. 3. The blurred image 18B is received from the sensor 10, and the correction terms 26 are applied at step 22 to provide the corrected blur image 30B, an output useful for diagnostics. The filter system 24 includes a blurred filter 24B which includes the application of the same anti-median filter 24C used in the focused filter 24A to the corrected blurred image. As the anti-median filter is applied to the corrected blurred image, the output is compared to the filter output stored from the previous focus frame via a NUC comparison function 24B2, described more fully below. The output of the comparison function yields error terms which are used to update the correction terms for the next input focus image.

FIGS. 6, 7A–7D and 8 illustrates the application of the anti-median filter 24C. The input image 18 is n pixels by n pixels in size. Each pixel has a numerical value representing brightness/intensity. For each pixel X in the image, the brightness/intensity values of X and two of its neighboring pixels are used to calculate a median value. The median is calculated by sorting the three pixels in ascending order of brightness/intensity values, and selecting the middle one of the sorted list to be the median. Two extra rows and columns of alternating Maximum (M) and minimum (m) values are added to the image to handle the boundary conditions. The "anti-median" is a measure of how the pixel differs from the median. The "anti-median" is calculated by subtracting the pixel "X" from the median as in the following:

anti_median(row, col)=median(row,col)−pixel(row,col)—col)

The result of the filtering is an n×n set 18D of anti-median values for the image 18.

Figure 8:
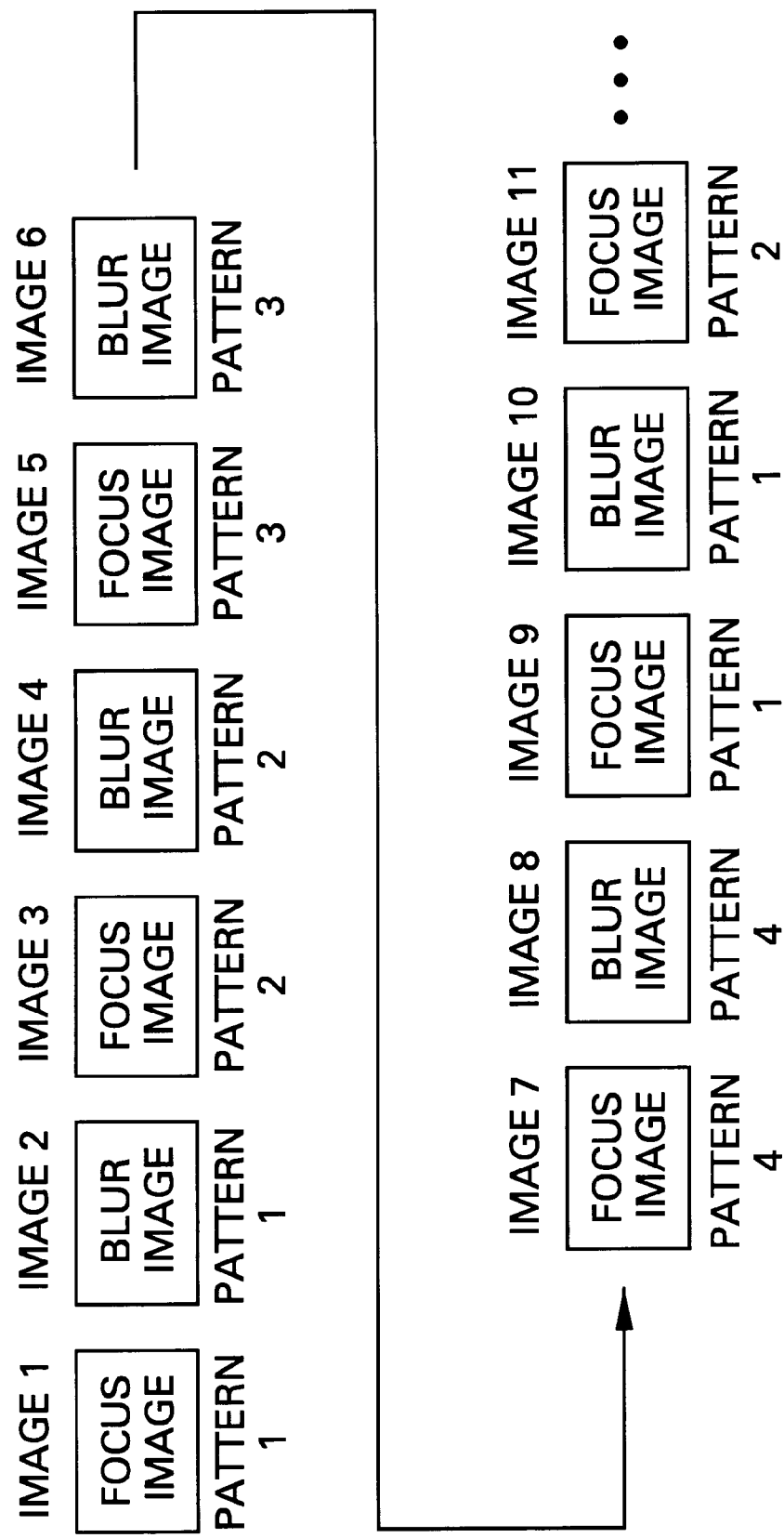
FIG. 8 illustrates the cycling of the filter patterns for each successive pair of focus/blur image frames.

There are four filter patterns, illustrated as patterns 1–4 in FIGS. 7A–7D, which are used in the filter system 24. In FIGS. 7A–7D, the shaded areas represents pixels that are used in the median calculation; the center pixel is marked as "X." The patterns are cycled, pattern 1 through pattern 4, for each successive pair of focus/blur image frames, as illustrated in FIG. 8. Thus, for a first set of focus/blur images, i.e. images 1 and 2, filter pattern 1 is used, for the second set of images 3 and 4, filter pattern 2 is used, for the third set of images 5 and 6, filter pattern 3 is used, and for the fourth set of images 7 and 8, filter pattern 4 is used, with the filter pattern cycle starting again with images 9 and 10.

The comparison function 24B2 (FIG. 5) is now described. Each value (row, column) of the anti-median image (focus) is compared to the corresponding value of the anti-median image (blur) as follows. Test 1: check whether the sign (±) of the anti-median focus is equal to the sign (±) of the anti-median blur. Test 2: check whether or not the anti-median blur is greater than some fraction (say, ¾) of the anti-median focus. If Test 1 and Test 2 pass, then the error term is set equal to the anti-median focus; otherwise the error term is set to zero.

The calculation of the anti-median can be positive or negative depending if the center pixel "X" is greater than or less than the median value. For example, assume that the median is 100 and the center pixel is 90. The anti-median would be equal to 100 minus 90, or positive 10. But if the center pixel was 115, then the anti-median would be equal to 100 minus 115 or −15 which is a negative value. The errors and the correction terms can be positive or negative. Positive values are used to correct pixels which are too dark. Negative values are used to correct pixels which are too bright.

The comparison function 24B2 may be written in the following manner:

if sign(anti_median_blur(row,col)=sign(anti_median_focus(row,col)
        and abs(anti_median_blur(row,col) greater than (NUC_FACTOR times (abs(anti_median_focus (row,col))
    then
        error_term(row,col)=anti_median_focus(row,col)
    else
        error_term(row,col)=0
    end if
    where NUC_FACTOR is ¾.

Figure 9:
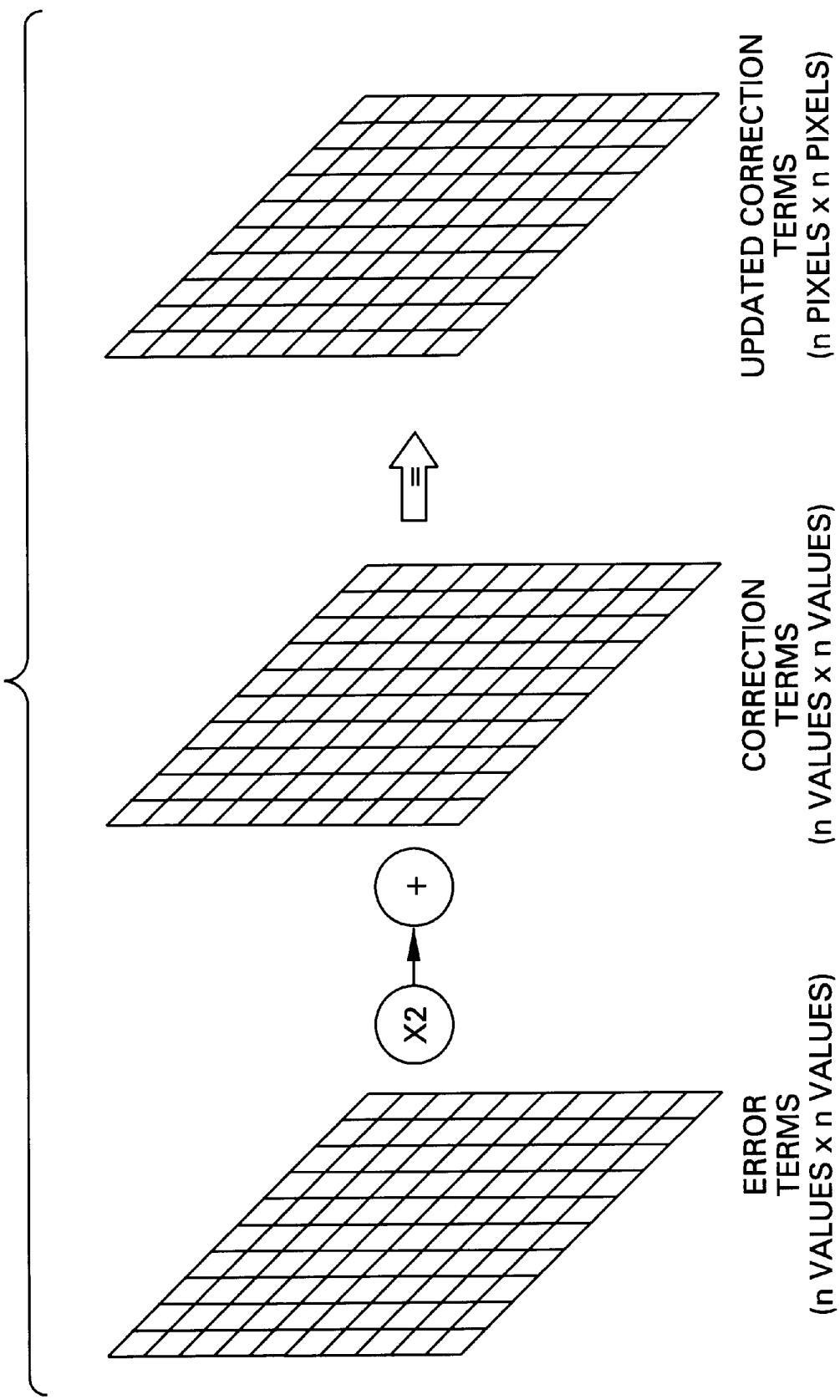
FIG. 9 illustrates diagrammatically the updating of the correction terms employed in the system of FIG. 3.

The error terms are used to update the correction terms. Each Error Term(row,col) is multiplied by two and then added to the Correction Term(row,col) to yield updated Correction Terms. Because the Correction Terms are of higher precision than the image, the Correction Terms are divided by eight before they are added to the image. The "multiply Error Terms by two, divide by eight" functions result in a one quarter (¼) correction of the estimated error. The updating of the Corrections terms is illustrated diagrammatically in FIG. 9, which shows the Error Terms (n values×n values) being multiplied by 2, and added to the existing set of Correction Terms (n values×n values), to yield an updated set of Correction Terms (n pixels×n pixels).

Figure 10:
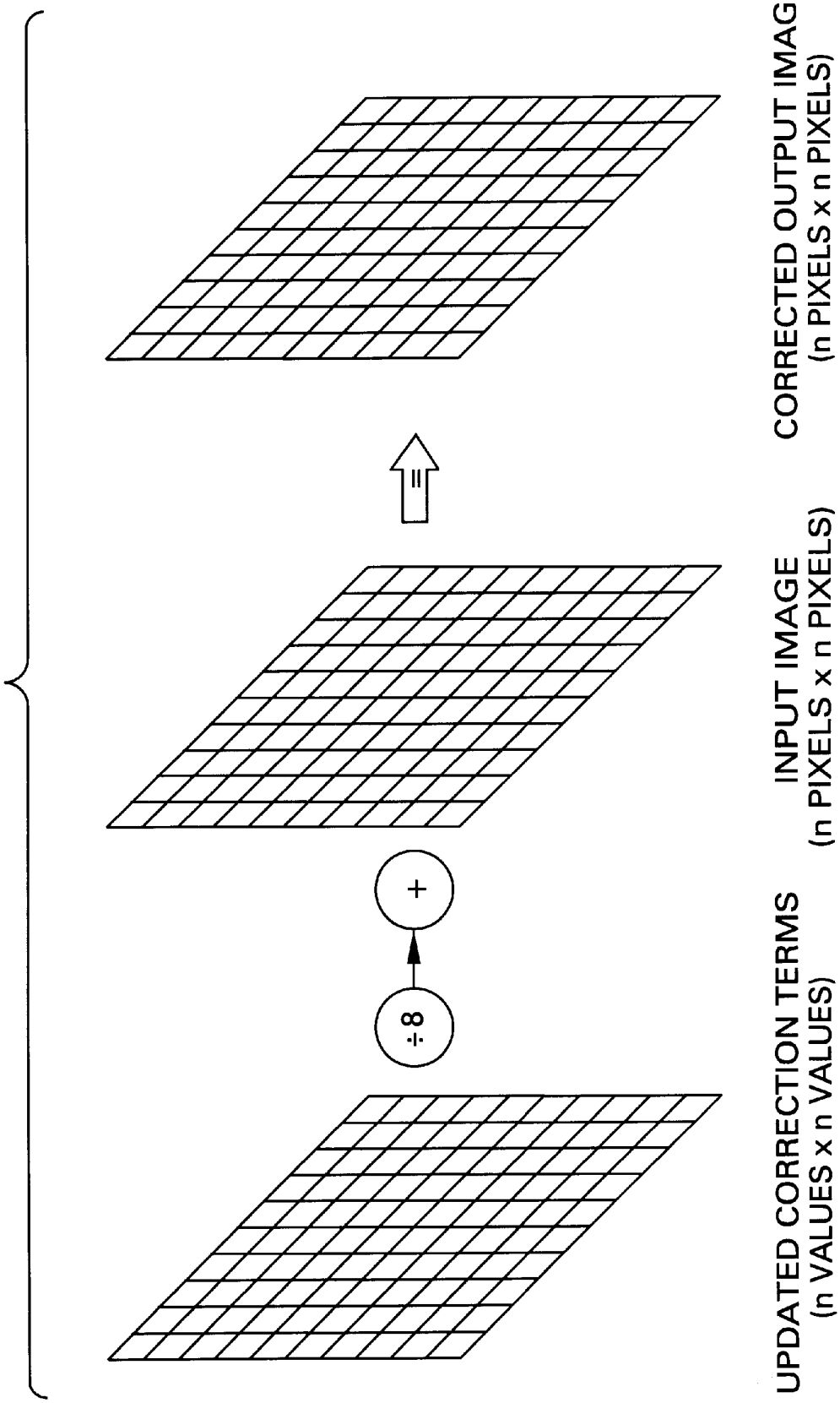
FIG. 10 illustrates diagrammatically the application of the correction terms to the input image for the filter system of FIG. 3.

The Correction Terms are accumulated over many frames and stored with eight times the precision of the image. Each Correction Term is divided by eight and then added to the input image pixel (row,col) to yield a new pixel (row,col) in the output image. This is illustrated diagrammatically in FIG. 10, where the updated set of Correction Terms (n values×n values) is divided by eight, and added to the input image (n pixels×n pixels) to yield the corrected output image.

Figure 11:
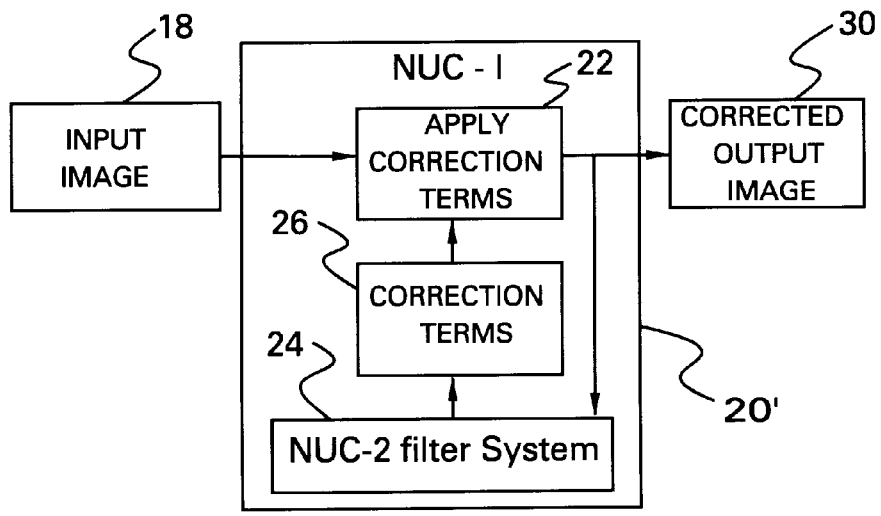
FIG. 11 illustrates an alternate embodiment of the invention.

FIG. 11 illustrates an alternate embodiment of the invention. An alternate NUC processor 20' applies the correction terms to the input image, and employs a NUC-II filter system 24' in the calculation of the Correction Terms. As in the embodiment of FIG. 3, the input image 18 (focused or blurred) is received from the sensor 10. The Correction Terms are applied at 22 to the input image to yield a Corrected output image 30'. The Correction Terms are initially zero, and are applied in same manner as described above regarding the processor 20. The Corrected output image is passed to both the Tracking system and the NUC-II filter system 24'. A different NUC-II filter is used for focused and blurred images, as will be described in further detail below. The NUC filter system 24' updates the Correction Terms based on the Corrected output image 30'.

Figure 12:
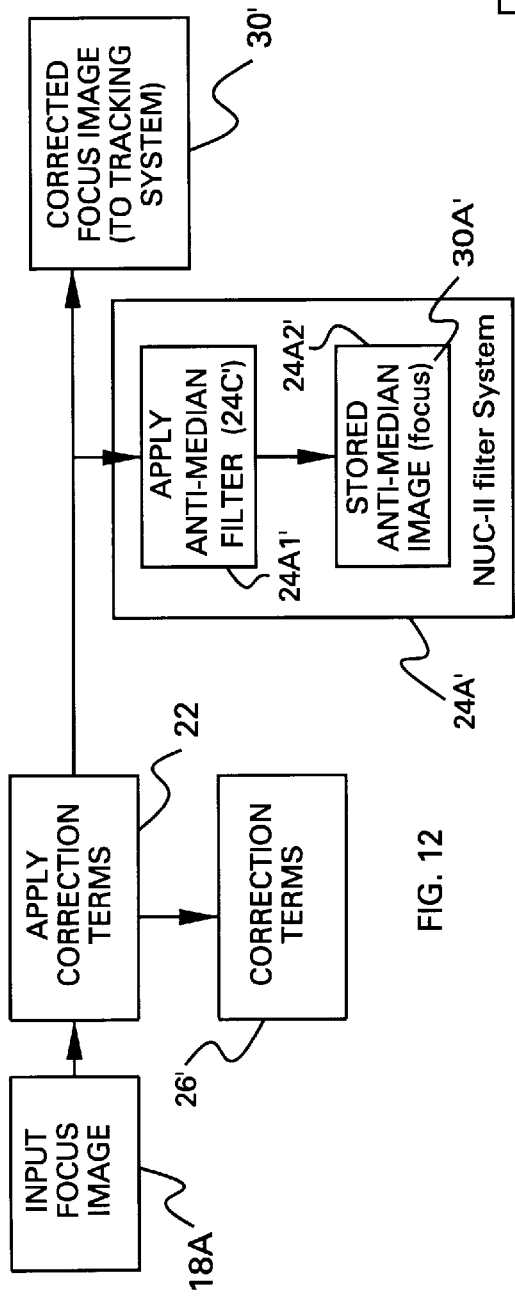
FIG. 12 illustrates the focussed image processing for the filter system of FIG. 11.

FIG. 12 illustrates the focused image processing for the filter system 24' of FIG. 11. The input focused image 18A is received from the sensor, and the correction terms 26' are applied at step 22 to yield the corrected focused image 30', as described above. The filter system 24' includes a focused image filter 24A', which includes the application of an anti-mean filter 24C' at step 24A1' to the corrected focused image to yield an anti-mean image 30A'. The image 30A' is stored in memory for use on the following blurred image 18B.

Figure 13:
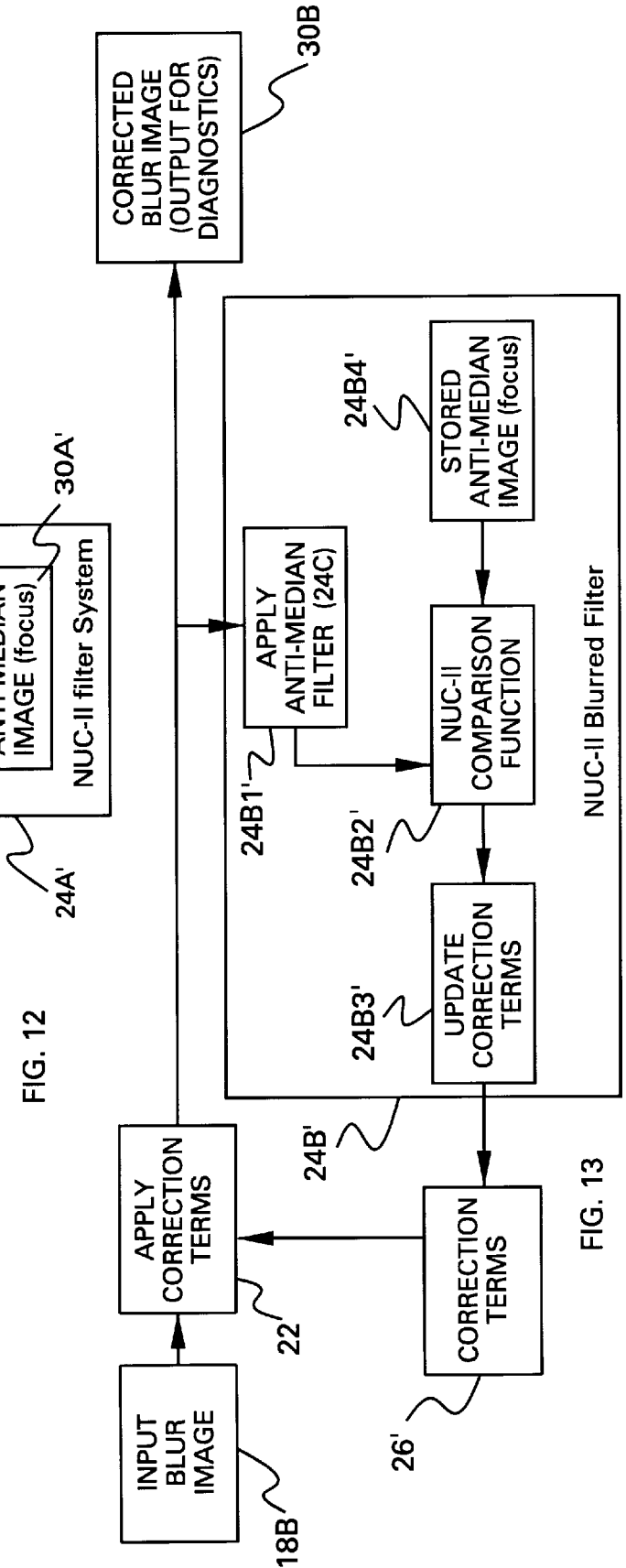
FIG. 13 is a flow diagram showing the blurred image processing for the filter system of FIG. 11.
Figure 14:
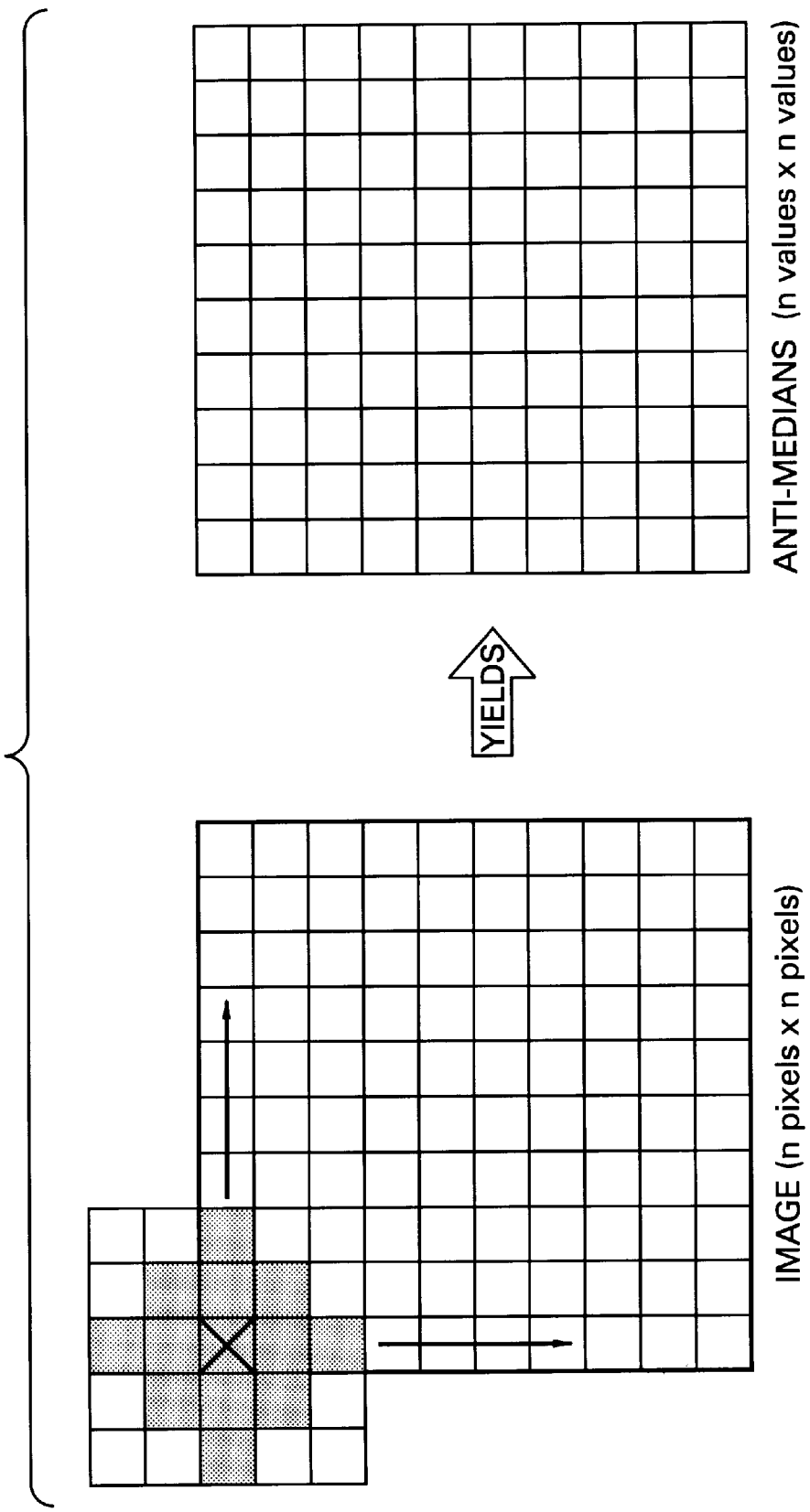
FIG. 14 illustrates the application of the anti-mean filter comprising the system of FIG. 11.

FIG. 13 is a flow diagram showing the blurred image processing for the filter system 24' of FIG. 11. The blurred image 18B is received from the sensor 10, and the correction terms 26' are applied at step 22 to provide the corrected blur image 30B', an output useful for diagnostics. The filter system 24' includes a blurred filter 24B' which includes the application of the same anti-mean filter 24C' used in the focused filter 24A' to the corrected blurred image. As the anti-mean filter is applied to the corrected blurred image, the output is compared to the filter output stored from the previous focus frame via a NUC-II comparison function 24B2', described more fully below. The output of the comparison function yields Error Terms which are used to update the Correction Terms for the next input focus image.

FIGS. 14, 15A–15D and 16 illustrate the application of the anti-mean filter 24C'. The input image 18 is n pixels by n pixels in size. For each pixel X in the image, the sum of X and its neighboring pixels indicated by the shaded regions in the filter mask is calculated. This sum is "Alpha-Trimmed" by subtracting the minimum and maximum pixel values contained within the filter mask. The mean is calculated by dividing the "Alpha-Trimmed" sum by number of pixels remaining in the sum. Filter mask pixels outside the image boundary are ignored in the calculation. This is illustrated by the location of the 13-pixel filter mask in FIG. 14, which illustrates the starting position for application to the n×n image. Because there are no values for seven of the mask pixels which are outside the image boundary, they must be ignored in the calculation of the mean. Thus, for this starting position of the filter mask, only six pixels of the filter mask cover the image, two are determined to be the minimum and maximum and are "Alpha-Trimmed," and the remaining four pixels are averaged together to determine a mean value. As the mask is passed across the image, all 13 mask pixels will lie within the image boundary and will be used in the calculation. Note that for the anti-median embodiment illustrated in FIG. 6, this boundary condition case is handled by having the extra Maximum (M) and minimum (m) values added around the outside boundary of the image. This cannot be done with the anti-mean filter because the Maximum (M) and minimum (m) values would bias the mean.

The "anti-mean" is a measure of how the pixel differs from the mean. The "anti-mean" is calculated by subtracting the pixel "X" from the mean as in the following:

anti_mean(row,col)=mean(row,col)−pixel(row,col)

There are two filter patterns used for the NUC-II filter system 24', and are shown in FIGS. 15A and 15B. The shaded areas represent pixels that are used in the mean calculation, with the center pixel marked as an "X". FIG. 16 shows the cycling of the filter patterns for each successive pair of focus/blur frames.

The comparison function 242B' includes the following steps. Each value (row,col) of the anti-mean image (focus) is compared to the corresponding value of the anti-mean image (blur) as follows: Test 1: check whether the absolute value of the difference between the anti-mean focus and the anti-mean blur is less than or equal to 5. Test 2: determine if the absolute value of the anti-mean focus is less than the absolute value of the anti-mean blur. If Test 1 and Test 2 pass, then the error term is set to the anti-mean focus. If Test 1 passes but Test 2 fails, then the error term is set equal to the anti-mean blur. If Test fails then the error term is set to zero and Test 2 is irrelevant.

Figure 17:
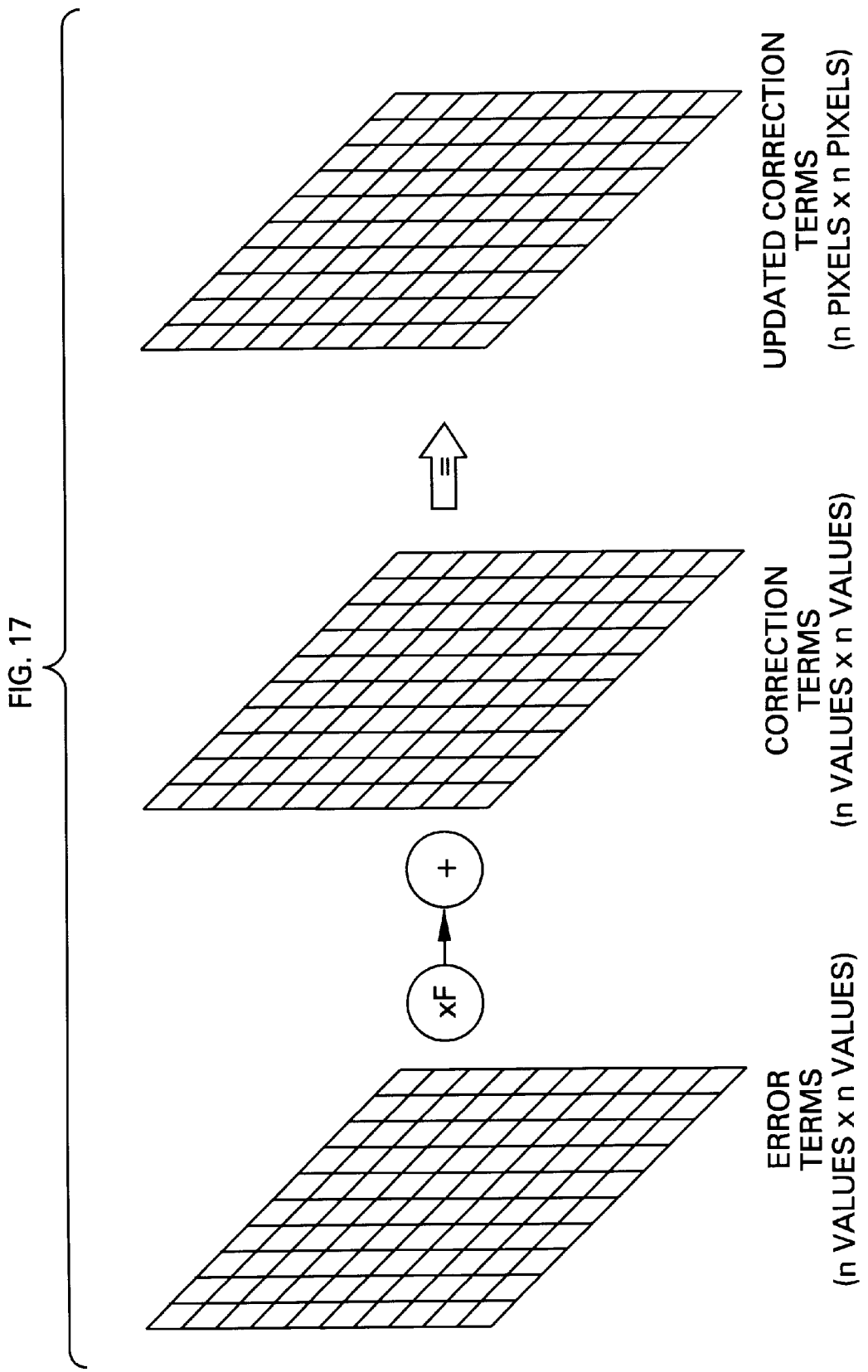
FIG. 17 diagrammatically illustrates the updating of the correction terms by the filter system of FIG. 11.

The Error Terms are used to update the Correction Terms 26'. FIG. 17 diagrammatically illustrates the updating of the Correction Terms. Each error term (row,-col) is multiplied by a factor (F) based upon its magnitude and then added to the Correction Term (row,col) to yield updated Correction Terms.

The factor (F) is calculated in the following manner. The absolute value of the Error Term is used to determine the factor (F) by which to multiply the Error Term. Say, for example, that the Error Terms have an absolute value range of zero (0) through 100. If the absolute value of the Error Term is 0 or 1, the factor (F) is set to 1. If the absolute value of the Error Term is 2 through 7, the factor (F) is set to 2. If the absolute value of the Error Term is 8 through 33, the factor (F) is set to 4. If the absolute value of the Error Term is 34 and greater, the factor (F) is set to 8. Because the Correction Terms are of higher precision than the image, they are divided by eight before they are added to the image. Therefore a factor (F) multiplier of 1 yields a correction of ⅛ of the error, 2 is ⅔ or ¼₄ is ⅛ or ½, and 8 is ⅝ or 1 which is a full correction.

In accordance with an aspect of the invention embodied in the system of FIG. 11, FPN is removed from focal plane array imagery by comparing the output of an anti-mean filter that is applied to both focused and optically blurred images. The comparison is done in such a way that scene artifacts are not created and subtle scene content is not destroyed. Because an anti-mean filter is used, FPN is removed even in the presence of shading. Shading can be caused by optics, blue-sky, and/or dome heating. The embodiment of FIG. 3 effectively "shuts off" in the presence of shading due to the use of an anti-median filter which preserves edges within the shading gradients.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. An adaptive method for removing fixed pattern noise from focal plane array (FPA) imagery, comprising the following steps:

obtaining respective focused and blurred digitized versions of an FPA image;

applying a set of correction terms to the focused version of said FPA image to provide a corrected, focused FPA image;

applying a filter to the corrected, focused version of said FPA image to obtain a filter focus image;

applying said set of correction terms to said blurred version of the FPA image to provide a corrected, blurred version of said FPA image;

applying said filter to the corrected, blurred image to provide a filter blur image;

calculating fixed pattern noise errors using the filter focus image and the filter blur image; and employing said fixed pattern noise errors to update the correction terms for use in processing a next FPA image.

2. The method of claim 1 wherein said filter includes an anti-median filter which provides, for each pixel in an image, a corresponding anti-median value which is a measure of how the pixel differs from a median value of the pixel and a set of neighboring pixels.

3. The method of claim 2 wherein said set of neighboring pixels includes two pixels on opposite sides of the pixel whose median value is to be calculated.

4. The method of claim 3 wherein said step of calculating said errors includes adding boundary rows and columns of pixels values of alternating maximum and minimum pixels values to said corrected output image to bound said output image and accommodate boundary conditions.

5. The method of claim 2 wherein said step of calculating said errors includes comparing corresponding values of said focus and blur images, and calculating a corresponding error term in dependence on said comparison.

6. The method of claim 1 wherein said filter includes an anti-mean filter which provides, for each pixel in an image, a corresponding anti-mean value which is a measure of how the pixel differs from a mean value of the pixel and a set of neighboring pixels.

7. The method of claim 6 wherein said set of neighboring pixels includes a group of neighboring pixels, and wherein pixels in said group having maximum and minimum values are excluded from calculation of said mean value.

8. The method of claim 6 wherein said step of calculating said errors includes comparing corresponding values of said focus and blur images, and calculating a corresponding error term in dependence on said comparison.

9. The method of claim 1 wherein said FPA image is an infrared image.

10. An adaptive sensor and non-uniformity compensation system for providing a corrected output image from a focal plane array (FPA), wherein fixed pattern noise has been compensated in FPA imagery, comprising:

a sensor comprising sensor optics, a focal plane array of infrared detectors for producing FPA images, and analog-to-digital conversion apparatus for converting said FPA images into digitized FPA images comprising a set of pixel values, the sensor optics adapted to provide focused and blurred versions of images;

an adaptive non-uniformity compensation processor for compensating for non-uniform sensitivities of said infrared detectors to infrared radiation, said processor adjusting each pixel value to compensate for the differing sensitivity of each detector in the FPA and provide a corrected output image, said processor comprising:

first means for applying a set of correction terms to a focused version of said FPA image to provide a corrected, focused FPA image;

a first filter system for applying a filter to the corrected, focused version of said FPA image to obtain a filter focus image;

second means for applying said set of correction terms to said blurred version of the FPA image to provide a corrected, blurred version of said FPA image;

a second filter system for applying said filter to the corrected, blurred image to provide a filter blur image;

third means for calculating fixed pattern noise errors using the filter focus image and the filter blur image; and fourth means for employing said fixed pattern noise errors to update the correction terms for use in processing a next FPA image.

11. The system of claim 10 wherein said filter includes an anti-median filter which provides, for each pixel in an image, a corresponding anti-median value which is a measure of how the pixel differs from a median value of the pixel and a set of neighboring pixels.

12. The system of claim 11 wherein said set of neighboring pixels includes two pixels on opposite sides of the pixel whose median value is to be calculated.

13. The system of claim 11 wherein said third means for calculating said errors includes means for comparing corresponding values of said focus and blur images, and means for calculating a corresponding error term in dependence on said comparison.

14. The system of claim 10 wherein said filter includes an anti-mean filter which provides, for each pixel in an image, a corresponding anti-mean value which is a measure of how the pixel differs from a mean value of the pixel and a set of neighboring pixels.

15. The system of claim 14 wherein said set of neighboring pixels includes a group of neighboring pixels, and wherein pixels in said group having maximum and minimum values are excluded from calculation of said mean value.

16. The system of claim 13 wherein said third means for calculating said errors includes means for comparing corresponding values of said focus and blur images, and means for calculating a corresponding error term in dependence on said comparison.

* * * * *